(12) United States Patent
Hanson et al.

(10) Patent No.: US 10,108,991 B2
(45) Date of Patent: Oct. 23, 2018

(54) INSTANT CUSTOMER SERVICE FEEDBACK SYSTEM

(71) Applicant: BANK OF AMERICA CORPORATION, Charlotte, NC (US)

(72) Inventors: Carrie Anne Hanson, Charlotte, NC (US); Alicia C. Jones-McFadden, Fort Mill, SC (US); Craig Sobol, Waxhaw, NC (US); Brent Alan Shelkey, Huntersville, NC (US); Kimberly Ya-chin Chang, Houston, TX (US); Sarah Beth Gottfried, Westlake, OH (US); Wang Liang, Pasadena, CA (US); Neha Rani Rathi, Reston, VA (US); Anthony Scott Wong, Union, KY (US)

(73) Assignee: Bank of America Corporation, Charlotte, NC (US)

( * ) Notice: Subject to any disclaimer, the term of this patent is extended or adjusted under 35 U.S.C. 154(b) by 411 days.

(21) Appl. No.: 14/530,209

(22) Filed: Oct. 31, 2014

(65) Prior Publication Data

US 2016/0125484 A1 May 5, 2016

(51) Int. Cl.
*G06Q 30/02* (2012.01)
*H04L 29/06* (2006.01)

(52) U.S. Cl.
CPC ..... *G06Q 30/0282* (2013.01); *H04L 65/1069* (2013.01); *H04L 65/403* (2013.01); *H04L 65/4015* (2013.01)

(58) Field of Classification Search
CPC .......................... G06Q 10/107; G06Q 30/016
USPC ............ 705/1.1, 80, 300–318, 342–348, 500
See application file for complete search history.

(56) References Cited

U.S. PATENT DOCUMENTS

| | | | |
|---|---|---|---|
| 6,587,128 B2 * | 7/2003 | Kanevsky | G06F 3/0481 715/768 |
| 6,724,887 B1 | 4/2004 | Eilbacher et al. | |
| 7,571,150 B2 | 8/2009 | Raghavan et al. | |
| 7,711,653 B1 | 5/2010 | Denham et al. | |
| 7,761,321 B2 | 7/2010 | Kannan et al. | |
| 7,877,265 B2 | 1/2011 | Pasquale et al. | |
| 7,895,330 B2 * | 2/2011 | Evanchik | H04L 12/581 379/265.09 |
| 7,996,251 B2 | 8/2011 | Kannan et al. | |
| 8,181,858 B2 * | 5/2012 | Carter | G06Q 10/0633 235/379 |
| 8,280,885 B2 | 10/2012 | Cardie et al. | |

(Continued)

*Primary Examiner* — Aryan E Weisenfeld
(74) *Attorney, Agent, or Firm* — Michael A. Springs; Moore & Van Allen PLLC; Peter B. Stewart

(57) ABSTRACT

Embodiments of the invention provide instant customer service feedback during a communication session with the customer. The system initiate a video conference communication session between the customer and the business agent that comprises providing a multimedia interface between the agent and the customer that provides the agent and the customer with an audio and video feedback of one another. After initiating the video conference communication session, a customer feedback interface configured to receive feedback from the customer in real-time during the video conference communication session is presented on the display of the customers apparatus such that the system may receive, in real-time, feedback provided by the customer via the customer feedback interface.

18 Claims, 6 Drawing Sheets

(56) References Cited

U.S. PATENT DOCUMENTS

| | | |
|---|---|---|
| 8,396,741 B2 | 3/2013 | Kannan et al. |
| 8,566,135 B2 | 10/2013 | Kannan et al. |
| 8,650,130 B2 | 2/2014 | Pasquale et al. |
| 8,830,291 B2 * | 9/2014 | Kay .................... H04M 3/5315 |
| | | 348/14.03 |
| 2011/0202617 A1 | 8/2011 | Naidu et al. |
| 2013/0046707 A1 * | 2/2013 | Maskatia ........... H04N 21/4622 |
| | | 705/347 |
| 2013/0173492 A1 | 7/2013 | Leavenworth et al. |
| 2014/0289647 A1 * | 9/2014 | Cortright .............. G06F 3/0481 |
| | | 715/753 |

* cited by examiner

INSTANT CUSTOMER SERVICE FEEDBACK SYSTEM

BACKGROUND

Customers of businesses, such as financial institutions or the like, that have many customer service outlets, otherwise referred to as centers, branches or the like, have come to expect that the various service outlets will have the immediate capability to address many of their particular special needs or services without the need of a physical visit to any of the service outlets. Likewise, businesses such as financial institutions have begun to streamline their operations for the sake of efficiency as they have come to realize that round-the-clock location of agents at each service outlet/center is inefficient. For example, in the financial institution setting, if each banking center employs at least one full-time mortgage/loan agent, a full-time small business agent and/or a full-time personal financial advisor/agent, the agent may only be called upon in regards to their specialty in the event a customer visits the banking center requiring assistance in the area of specialty.

Certain businesses, such as financial institutions and the like, have addressed the problem associated with staffing service outlets with full-time agents by utilizing video conferencing systems. Specifically, such video conferencing systems may employ two-way video conferencing communication between a customer, who is located at the service outlet/banking center, home, or the like, and an agent, who is located remotely from the location of the user such as a service outlet/banking center. Both customer and agent receive audio and video feeds of the other participant. Alternatively, a one-way video conferencing system provides the customer a video and audio feed of a remote agent, while the remote agent is limited to receiving an audio feed from the customer. Such video conferencing systems are set-up in private settings within the business to provide the customer assurance that the information exchanged during the communication session is held in private. In this regard, a any location equipped with video conferencing communication can provide customers on-demand access to agents having different areas of specialty/expertise without requiring the full-time physical presence of the agent at the business outlet/center or the presence of the customer within the business outlet/center.

In certain instances, it necessary for the customer to provide useful feedback related to the video conference so that the business is able to gain insight and provide the customer with a more enriched experience in the future. However, customers don't always share their experiences beyond their close networks which can make it difficult for businesses to receive feedback to improve future interactions. Traditional feedback methods, such as surveys and social media, place the burden on the customers and only provide information to the business after the customer service interaction has ended.

Therefore, a need exists to develop systems, apparatus, methods, computer program products and the like that provide the customer with a means to easily give real-time feedback during an interaction with the business. The desired aspects should alleviate problems related to the missed opportunities of enriching a relationship with a customer due to valuable customer feedback not being received.

BRIEF SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, computer program products or the like for providing an instant customer service feedback system. An exemplary system for providing instant customer service feedback may comprise a video conferencing apparatus including a processor, a memory, a display in communication with the processor, a video camera in communication with the processor, a speaker in communication with the processor, and a microphone in communication with the processor, and a video conferencing module. The video conferencing module may be stored in the memory and comprise executable instructions that when executed by the processor cause the processor to transmit an indication that a customer requires communication with a business agent that is remotely located from the customer. The system may then initiate a video conference communication session between the customer and the business agent, wherein initiating the video conference session comprises providing a multimedia interface between the agent and the customer that provides the agent and the customer with an audio and video feedback of one another. After initiating the video conference communication session, the system may initiate presentation on the display of a customer feedback interface configured to immediately receive feedback from the customer during the video conference communication session, and immediately receive feedback provided by the customer via the customer feedback interface.

In some embodiments, the system may be further configured to present the customer an option provide feedback throughout the video conference communication session, in response to determining the customer accepted the option to provide feedback, determine to present the customer feedback interface on the display, and in response to determining the customer declined the option to provide feedback, determine to not present the customer feedback interface on the display.

In some embodiments, the customer feedback interface is periodically presented on the display based on the status of the video conference communication session.

In some embodiments, the customer feedback interface is constantly presented on the display throughout the entire video conference communication session.

In some embodiments, the customer service interface is customized based on customer preferences such that the method of feedback utilized by the customer service interface is determined based on receiving the customer preferences.

In some embodiments, the method of feedback utilized by the customer service interface comprises a like and dislike system for gauging the customers experience throughout the video conference communication session, such that the customer may indicate whether or not they liked or disliked at least one aspect of the video conference communication session.

In some embodiments, the method of feedback utilized by the customer service interface comprises a grading system for gauging the customers experience throughout the video conference communication session, such that the customer may grade at least one aspect of the video conference communication session.

In some embodiments, the system may be further configured to immediately analyze the feedback received from the customer, and concurrently thereafter escalate the video conference communication session to a second business agent in response to determining the feedback received from the customer was negative, wherein the negative feedback exceeds a predetermined threshold for escalating video conference communication sessions.

In some embodiments, the system may be further configured to immediately analyze the feedback the feedback received from the customer, and concurrently thereafter assign the business agent a customer service rating based on the feedback received from the customer.

In some embodiments, the system may be further configured to create a historical list of customer service rating that have previously been provided by the customer via the customer feedback interface, and determine whether or not a business agent should assigned to the video conference communication session based on the historical list of customer service ratings.

In some embodiments, the system may be further configured to immediately analyze the feedback received from the customer, and determine at least one method to improve the customers customer service experience based on the feedback received from the customer.

In some embodiments, the system may be further configured to dynamically position the customer feedback interface, on the display, such that the customer feedback interface may be repositioned into one or more non-fixed orientations throughout the video conference communication session.

In some embodiments, the system may be further configured to determine the position of the customer feedback interface, on the display, based on (i) determining the video conference communication session is utilizing a template for displaying information to the customer, and (ii) determining whether or not the position of the customer feedback interface is overlaying at least a portion of the information, wherein the customer feedback interface is presented in a position that does not overlay the at least portion information being displayed to the customer.

In some embodiments, the system may be further configured to determine a level of transparency of the customer feedback interface based on determining whether or not the position of the customer feedback interface is overlaying at least a portion of information being presented on the display, and in response to determining the customer feedback interface is overlaying at least a portion of information being presented on the display, decrease the level of transparency of the customer feedback interface, and in response to determining the customer feedback interface is not overlaying at least a portion of information being presented on the display, increase the level of transparency of the customer feedback interface.

As such, the present invention improves the functionality of video conferencing applications and general communication sessions to provide an instant feedback system to the user and to the business that provides dynamic feedback in real-time such that the business receives feedback from the customer simultaneously as they are communicating with the customer and thereby optimizes the traditional sense of customer service feedback methods. The tool of the present invention is an improvement over traditional customer feedback methods because it allows the business to be presented with feedback in real-time during interactions with the customer that would previously have been provided to the business after the communication session with the customer had ended. The present invention increases the level of responsiveness from customers during feedback requests as customers are more likely to provide feedback during an interaction, and less likely to provide feedback when they are finished communicating with the business. In traditional customer feedback methods, the user is tasked with having to provide feedback after the communication session has ended such as a requesting the customer to respond to a survey at the end of the call. This feedback only helps to alter future experiences with the customer not present experiences with the customer. This method is not effective because in some instances a detrimental experience may lead to losing a customer's business in which the business will not have future chances to recuperate the damaged relationship. As such, the present invention eliminates the burden that a business faces of trying to invent new ways to improve the experience of a customer in real-time throughout their present interaction with the business by providing technical solutions that augment or enhance current feedback methods to be automated and provided in real-time. For at least these reasons, the present invention related to the instant customer service feedback system is significantly more than the traditional video conferencing tools.

In addition, the present invention provides tangible feedback using the dynamic interface that otherwise could not be achieved without the present invention. The tangible results include graphs, charts, grades, and open ended feedback such that the feedback is presented on the display of the business agent based on the users' real-time response to feedback request. In traditional feedback methods, the business is limited to only receiving analysis of the customer's feedback after the customer is no longer able to be influenced. As such, the present invention optimizes feedback methods by enhancing the businesses ability to positively improve the customer's experience and real-time. The present invention additionally optimizes feedback methods by automating task that are traditionally manually handled by the business agent (e.g. call transfers) based on the analysis of the feedback received by a customer.

Moreover, the system (e.g., processor, or the like) of the present invention cannot be performed by a human with pen and paper because among other reasons, the human would not be able to visually present the feedback to the business in real-time or near real-time as the user provides feedback for various aspects of the communication session. Furthermore, the human would not be able to automatically initiate task within the businesses systems (e.g. call transfers) based on feedback being provided.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
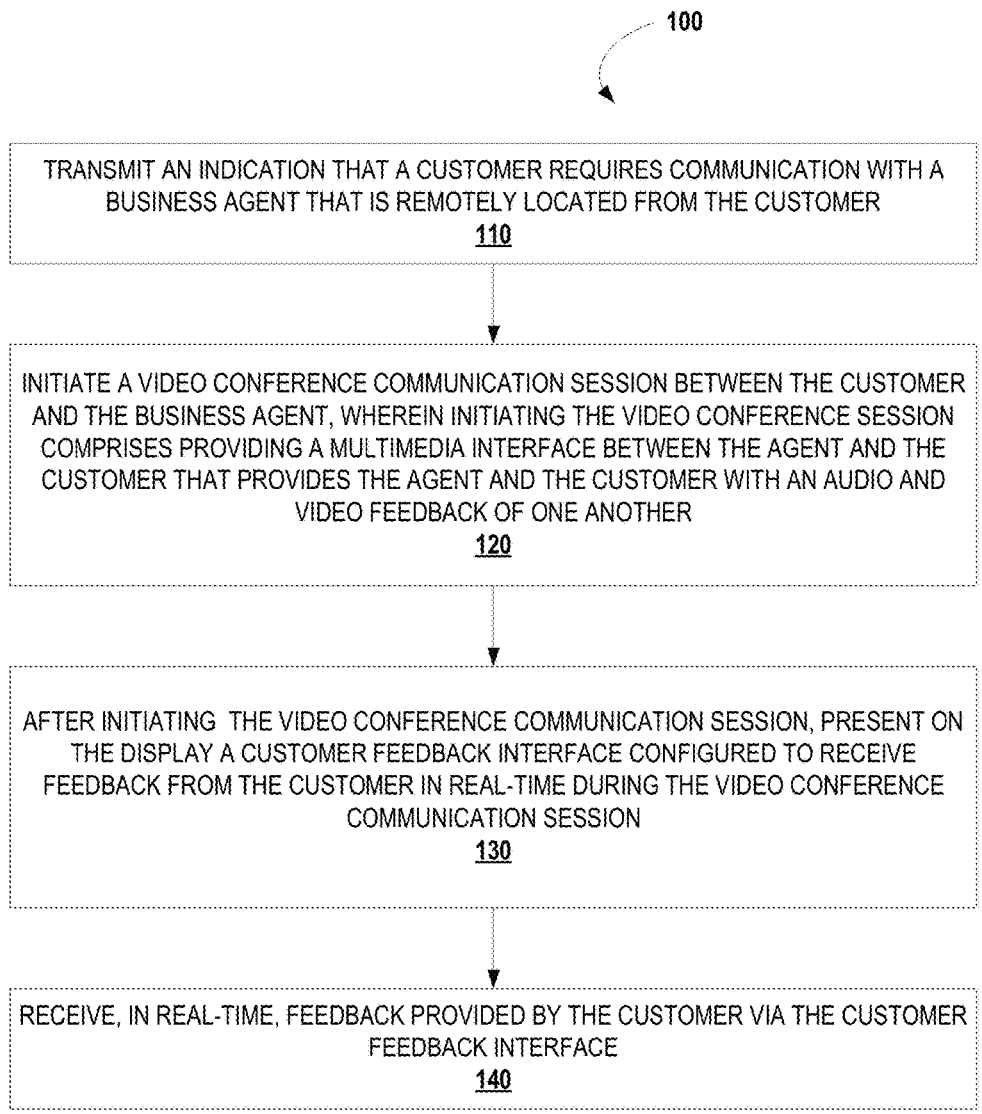
Figure 2:
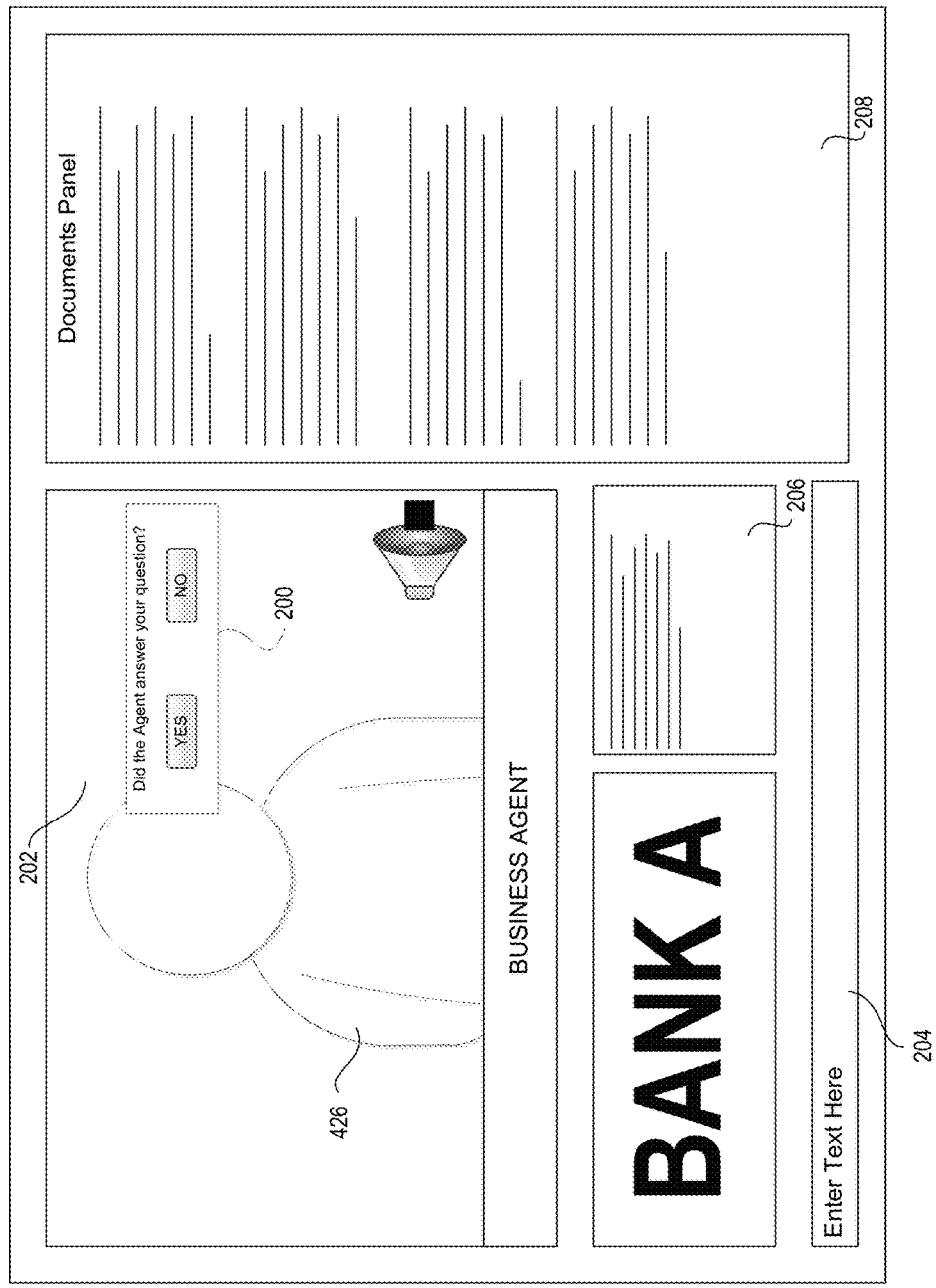
Figure 3A:
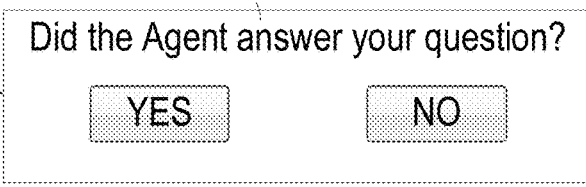
Figure 3B:
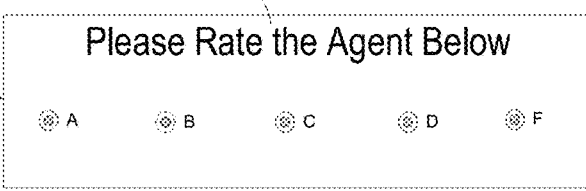
Figure 3C:
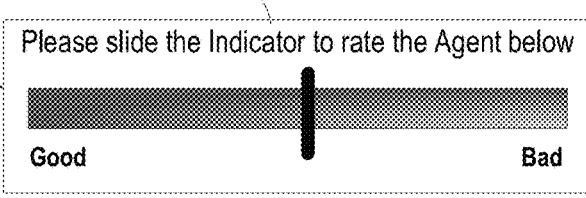
Figure 3D:
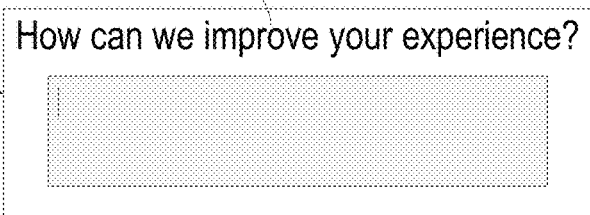
Figure 3E:
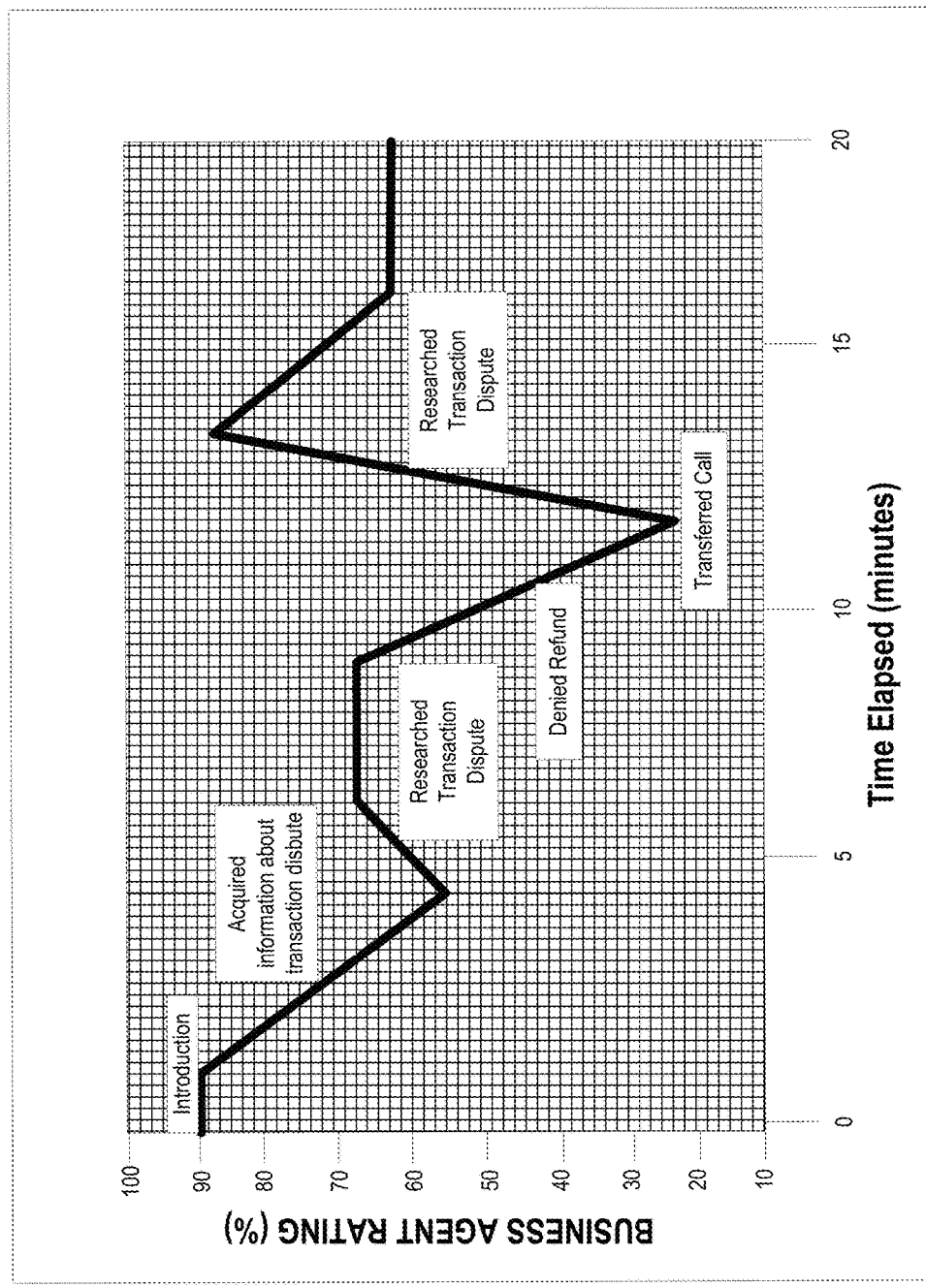
Figure 4:
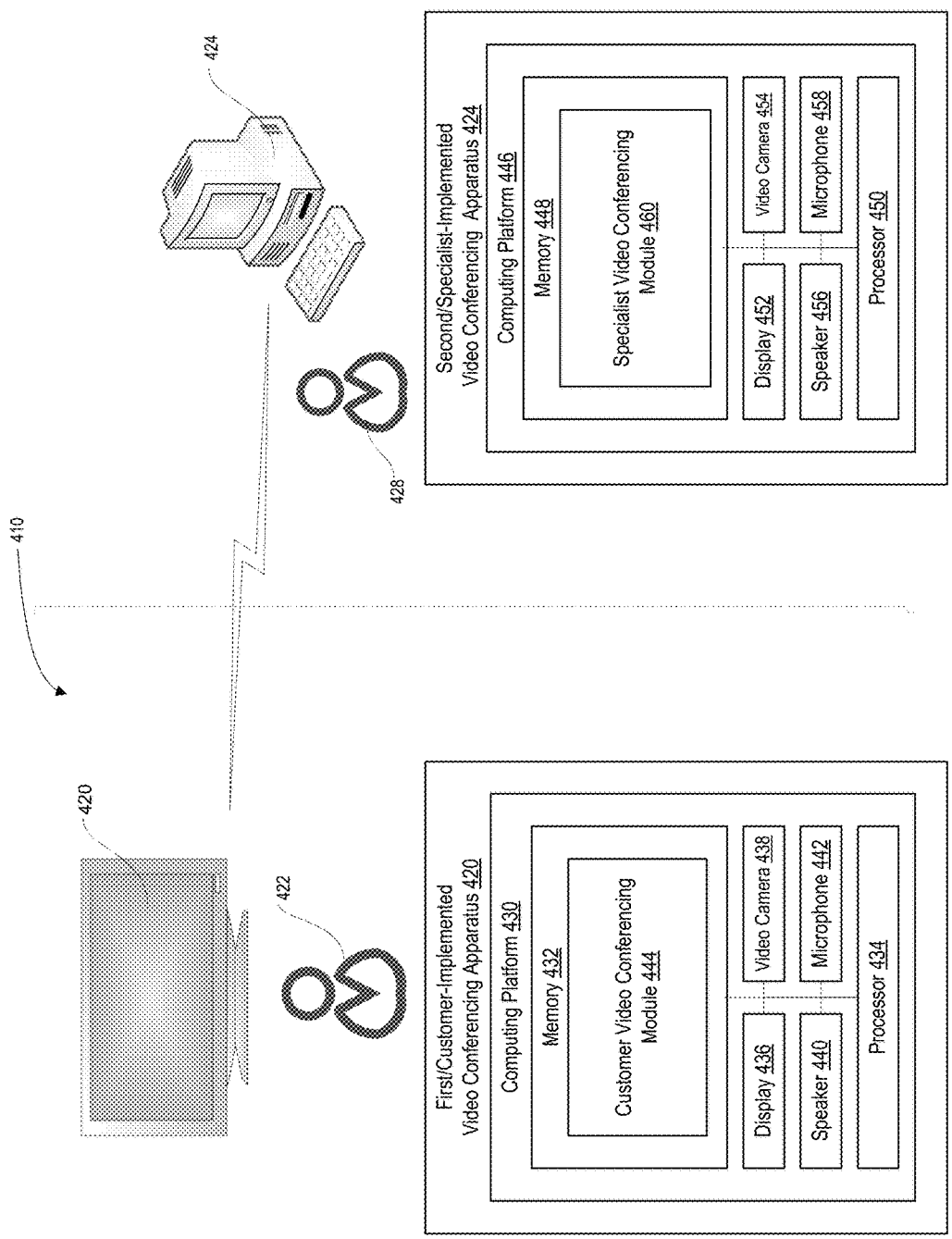
Figure 5:
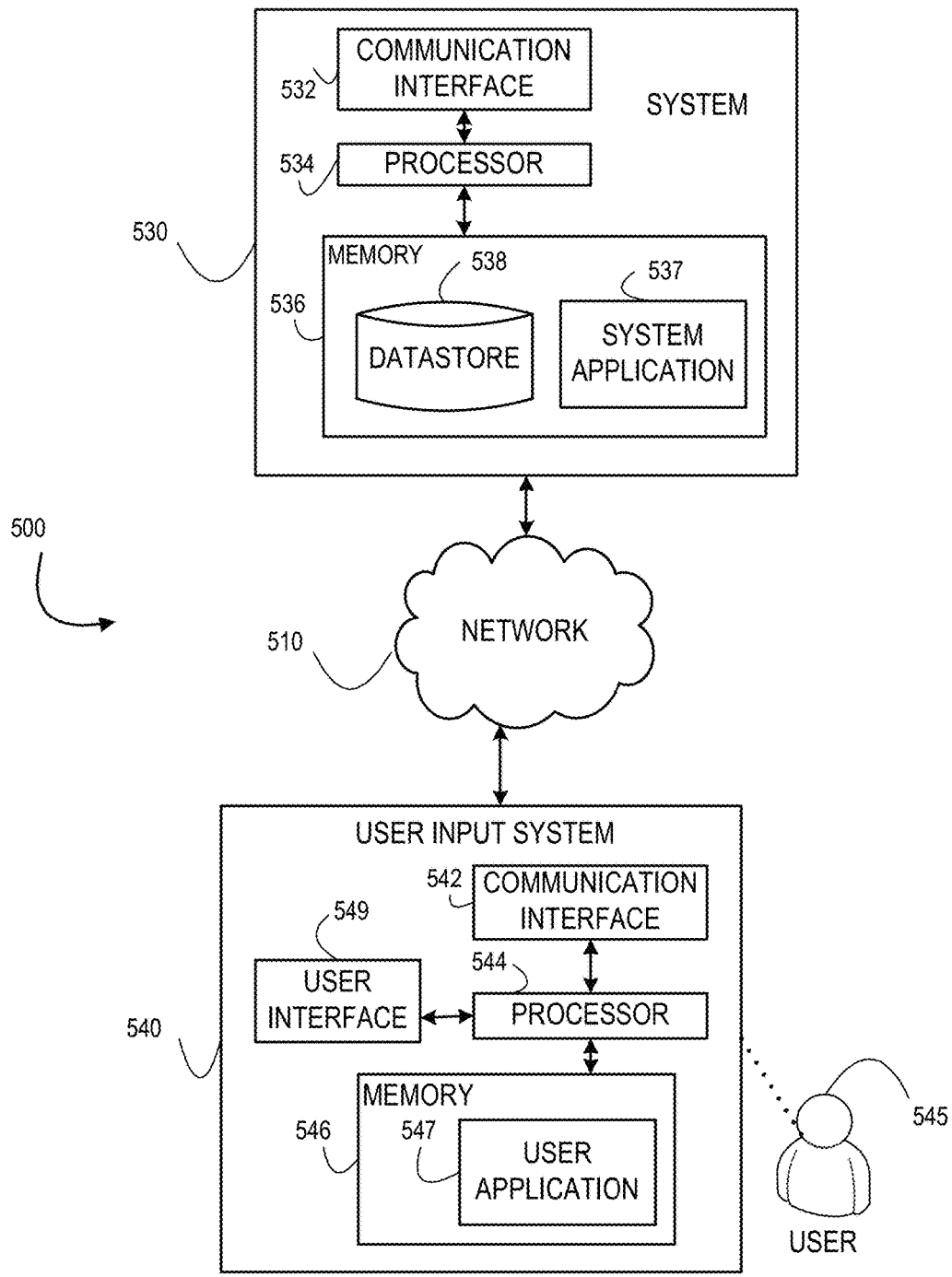

Having thus described embodiments of the invention in general terms, reference will now be made the accompanying drawings, wherein:

FIG. 1 is a flow diagram illustrating a general process flow providing instant customer service feedback, in accordance with an embodiment of the invention;

FIG. 2 is a schematic illustrating a an interface for receiving customer feedback in conjunction with a video conference apparatus display, in accordance with an embodiment of the invention;

FIG. 3A is a schematic illustrating an interface for receiving customer feedback, in accordance with an embodiment of the invention;

FIG. 3B is a schematic illustrating an interface for receiving customer feedback, in accordance with an embodiment of the invention;

FIG. 3C is a schematic illustrating an interface for receiving customer feedback, in accordance with an embodiment of the invention;

FIG. 3D is a schematic illustrating an interface for receiving customer feedback, in accordance with an embodiment of the invention;

FIG. 3E is a schematic illustrating an interface for receiving customer feedback, in accordance with an embodiment of the invention;

FIG. 4 is a schematic and block diagram of a system configured for providing instant customer service feedback, in accordance with an embodiment of the invention; and FIG. 5 is an exemplary system diagram configured for providing instant customer service feedback, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

Embodiments of the invention are directed to systems, methods and computer program products for providing instant customer service feedback. The invention enables a customer to provide feedback related to the quality of service that a business is providing in real-time during the interaction with the business.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution.

In some embodiments, the "user" may be a customer of a particular business entity (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. More specific examples (e.g., a non-exhaustive list) of the computer-readable medium include the following: a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

Computer program code/computer-readable instructions for carrying out operations of embodiments of the present invention may be written in an object oriented, scripted or unscripted programming language such as Java, Perl, Smalltalk, C++, SAS, SQL, Python, Objective C, and/or the like. However, the computer program code/computer-readable instructions for carrying out operations of the invention may also be written in conventional procedural programming languages, such as the "C" programming language or similar programming languages. The computer program code may alternatively or additionally be written in one or more multi-paradigm programming languages, such as, for example, F#.

Some embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the functions/acts specified in the flowchart and/or block diagram block or blocks.

These computer program instructions may also be stored in a computer-readable medium (e.g., a memory, etc.) that can direct, instruct, and/or cause a computer and/or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Instant Customer Service Feedback System

Referring now to FIG. 1, a general process flow 100 is illustrated for providing instant customer service feedback. In some embodiments, the process flow 100 is performed by a system (i.e., one or more apparatuses) having hardware and/or software configured to perform one or more portions of the process flow 100. In such embodiments, as represented by block 110, the system is configured to transmit an indication that a customer requires communication with a business agent that is remotely located from the customer. As represented by block 120, the system is also configured to initiate a video conference communication session between the customer and the business agent. As represented by block 130, the system is then configured to present on the display a customer feedback interface configured to receive feedback from the customer in real-time during the video conference communication session. Lastly, as represented by block 140, the system is configured to receive, in real-time, feedback provided by the customer via the customer feedback interface.

It will be understood that the system having the process flow 100 can include one or more separate and/or different apparatuses. For example, in some embodiments of the invention, a single apparatus (e.g., customer-implemented video conferencing apparatus 420 described in connection with FIG. 4) is configured to perform all of the portions of process flow 100 represented by blocks 110 to 140. However, in some other embodiments, a first apparatus (e.g., customer-implemented video conferencing apparatus 420 described in connection with FIG. 4 is configured to perform the portions of process flow 100 represented by block and 110 and 120 and a second apparatus (e.g., agent-implemented video conferencing apparatus 424 described in connection with FIG. 4) is configured to perform the portions of process flow 100 represented by blocks 130 and 140.

The system may include a customer-implemented video conference apparatus that is located within a private setting (e.g. a business location or home of the customer), such that the customer can communicate and exchange private information with the system, and more specifically an agent associated with the business and interacting with the customer during the video conference session. In one specific example, the customer-implemented video conference apparatus may be located within an enclosed office space at a financial institution, such as a banking center. In addition, the customer-implemented video conference may include several integrated devices such as a display, a video camera, a speaker, and a microphone, all of which are configured to allow the user to communicate with and view the agent as well as documents presented during the video conference session. The customer-implemented video conference may operate a customer module that is configured to implement the display, the video camera, the speaker, and the microphone within the video conference system to conduct a video (and audio) communication session (e.g., a video chat session) with an agent that is located physically remote from the location at which the customer-implemented video conference is located. It should be noted that, as used herein, the term video conferencing apparatus may refer to the customer-implemented video conferencing apparatus and the agent-implemented video conferencing apparatus operating in conjunction with one another as such the customer-implemented video-conferencing apparatus may be configured to process functions described in conjunction with the video-conferencing apparatus and vice versa.

At block 110, the system transmits an indication that a customer requires communication with a business agent that is remotely located from the customer. The indication may be received as a request from the customer to initiate a video conference session between the customer and an agent of a particular business such as a financial institution. The request may be received from within a platform such as an online banking platform in which the indication may be transmitted directly from a server of financial institution to an agent-implemented video conference apparatus. For example, the customer may access their online banking account using various customer authentication credentials, after accessing the online banking account the customer may request (from within the online banking platform specifically associated with the customers bank account) to initiate a video conference session with an agent of the financial institution. The request may then be transmitted by an online banking server to the video conference apparatus of an agent that is qualified to handle the customer's request. In this way, the agent may receive a transmitted indication that a customer is attempting to connect with them via a video conference session.

It should be noted that although, in the embodiments discussed herein, the customers "request to communicate with a business agent" is implemented by a video conference session, the "request to communicate" may also refer to or include initiating a telephone call, a chatting window, email correspondence, and other forms of electronic communication not explicitly contemplated here. In this way, the video conference apparatus may refer to other computing devices such a mobile phones, landline telephones, laptop computers, desktop computers, computing tablets, and other devices configured to support various forms of electronic communication.

As such, the transmitted request or indication may comprise information relevant to establishing a network connection between an apparatus of the customer (e.g. customer-implemented video conference apparatus) and an apparatus of the agent (e.g. agent-implemented video conference apparatus). The information relevant to establishing a network connection between the apparatuses or devices of the agent and the customer may include but not be limited to machine identifying information (e.g. domain, name, IP address, and the like), email address, telephone number, video-conference system customer name, and the like). After receiving the required information, the system may establish a network connection between a video conference system and a mobile device of a customer. In an exemplary embodiment, the video conference system is maintained by an entity such as a financial institution and the customer has an account with the financial institution.

In some embodiments, the established network connection between the customer-implemented video conference apparatus and agent-implemented video conference apparatus facilitates a two-way communication system between the agent-implemented apparatus and the customer-implemented apparatus. Through the two-way communication system, the agent-implemented apparatus is configured to send and receive data to and from the customer-implemented apparatus, and the customer-implemented apparatus is configured to send and receive data to and from the agent-implemented apparatus. In some embodiments, information is sent from the customer-implemented apparatus and received at the agent-implemented apparatus in response to the agent-implemented apparatus sending a request for information/data to the customer's customer-implemented apparatus. For example, the specialist may request information from the customer-implemented apparatus that may aid in authenticating the customer's identity. The customer-implemented apparatus may then send the agent-implemented apparatus one or more customer authentication credentials in response to receiving the request. In some embodiments, information is sent from the agent-implemented apparatus and received at the customer-implemented apparatus in response to the customer-implemented apparatus sending a request for information/data. For example, the customer may use the customer-implemented apparatus, and more specifically the customer feedback interface, to send a request for a particular set of forms to be received from the agent-implemented apparatus, and more specifically the associated specialist. In response to the request, the specialist may then send the forms to the customer's customer-implemented apparatus via the agent-implemented apparatus. The forms may additionally be sent automatically based on other factors presented within the video conference session without a need for external input from either the customer or the specialist. In other embodiments, information may be exchanged between the agent-implemented apparatus the customer-implemented apparatus on a continuous and/or semi-continuous basis. For example, the agent-implemented apparatus and the customer-implemented apparatus may continuously exchange call/video log information related to the history of a video conference session that has been initiated between the agent-implemented apparatus and the customer-implemented apparatus. In this way, a record or log of the session and documents or information exchanged may be maintained on both the agent-implemented apparatus and the customer-implemented apparatus.

At block 120, after transmitting an indication that a customer requires communication with a business agent that is remotely located from the customer, the system may then initiate a video conference communication session between the customer and the business agent. Initiating the video conference session comprises providing a multimedia interface between the agent and the customer such that the agent and the customer are provided with an audio and video feedback of one another. As shown in FIG. 2, the video conference session may allow the user to communicate and/or view a business agent via a video and/or audio feed 202 presented on a display within the video conference apparatus. As further illustrated in FIG. 2, through the display or other applications provided on the display, the user may have access to a range of functions including chatting capabilities through text input boxes 204 and dialogue boxes 206, the ability to review information presented by the specialist via document presentation panels 208, and the ability to provide instant feedback to the business by utilizing the customer feedback interface 200.

In some embodiments, initiating a video conference session between an agent of the business and the customer may further comprise authenticating the customer's identity prior to initiating the session. However, in other embodiments, if the request to communicate with the agent was received from within a previously authenticated platform (e.g. from within the online banking platform), the authentication step may not be necessary or a less stringent form of authentication may be used. In an exemplary embodiment, the authentication is based at least partially on customer input or general information that verifies that customer is an account holder of the financial institution. The customer input or general information may be received from the customer-implemented apparatus via the established network connection. The customer input or general information may typically comprise one or more authentication credential associated with the customer. The requested and/or received authentication credentials may vary based on the type of video conference session being initiated, and more specifically the type of transactions that the customer may complete (or is expected to complete) throughout the session. In this way, numerous types and levels of customer authentication may exist, and the customer may be initially authenticated for a primary level of access to conduct general transactions within the video conference session, and the customer may be required to provide a subsequent stricter authentication in an instance where a need exist to conduct a transaction that is not provided within the primary level of access received. For example, the primary level of access may include the customer being able to verify that they are an account holder with the entity (e.g. financial institution) by providing an account number and related password such that the customer is able to interface with an agent and ask questions about loan options that the financial institution offers. In an event that the customer decides to apply for a loan while within the video conference session, the customer may be required to provide additional authentication credentials, such as a social security number, prior to being sent a loan application form. In some embodiment, the received authentication credentials may be used by the agent and/or the video conference system to prepare documents (e.g. a loan application) for use within the video conference session. The customer authentication credentials that may be sent via the customer-implemented apparatus may include, but not be limited to, a customer name, password, account number, full-length social security number or partial digits, challenge questions, familiar pictures and/or phrases, biometrics, key fob-based alphanumeric codes, and the like. In some embodiments, the customer authentication credentials are explicitly provided by the customer, and in other embodiments the customer authentication credentials are stored within the customer's customer-implemented apparatus and automatically transferred, in response to a request, to the video conference system on the customer's behalf.

In an alternate embodiment, the customer's identity is authenticated prior to establishing a secured network connection. In such an embodiment, the system may first establish a general and/or unsecured network connection with the customer-implemented apparatus solely for the purpose of authenticating the customer's identity. Information transmitted through the unsecured network connection, such as sensitive customer information maintained within customer authentication credentials, may be required to be encrypted prior to being sent from the customer-implemented apparatus to the video conference system. As such the customer-implemented apparatus may separately send a decryption key to the video conference system. After the customer has been authenticated and the customer's identity has been subsequently verified, the system may then establish a secure network connection between the video conference system and the customer-implemented apparatus of the customer such that sensitive information (e.g. customer financial data) may be transmitted through the secured without requiring encryption prior to being sent.

At block 130, after initiating the video conference communication session, the system may then present on the display a customer feedback interface configured to receive feedback from the customer in real-time during the video conference communication session. The customer feedback interface may be presented at any orientation or configuration about the display of the customer-implemented video conference apparatus. The customer feedback interface may be embodied by a widget or other application that provides feedback via various methods including but not limited to polling, surveys, open-ended responses (e.g. comment boxes), and the like. Also it should be noted that while exemplary embodiments discussed herein reference the use of a video conference communication session, embodiments of the present invention may be used interchangeably with other forms of communication such as an online banking session or the like.

In some embodiments, the customer is provided an option as to whether or not they want to provide feedback throughout the communication session. In response to opting in to provide feedback the system will determine to present the customer with a customer feedback interface after the communication session has been initiated based on the user opting in to provide feedback. In response to opting out of providing feedback the system will determine to not present the customer with a customer feedback interface after the communication session has been initiated based on the user opting in to provide feedback. At any given time throughout the communication session, a customer that has previously opted in to providing feedback can indicate that they no longer wish to provide feedback such that the customer feedback interface is removed from their display, and a customer that has previously opted out of providing feedback can indicate that currently wish to provide feedback such that the customer feedback interface is subsequently presented on their display. In an alternative embodiment, the customer feedback interface is automatically presented on the customers display regardless of whether or not they have previously specified a desire to provide feedback during the communication session. As such, the customer feedback interface may be configured to be minimized or maximized on the customers display at any time throughout the communication session.

In some embodiments, the customer feedback interface is constantly presented on the display throughout the entire communication session. In alternative embodiments, the customer feedback interface is periodically presented on the display based on various factors throughout the communication session. For example, in one embodiment, the customer feedback interface may be presented in response to the system determining that the customers call has been transmitted to a second business agent, which may indicate that the customer either had a negative experience with the first agent or the first agent was not able to process the customer's request or answer their questions. In another example, the customer feedback interface may be presented in response to the system monitoring the documents and topics being discussed during the communication session and providing a request for a response during the communication session. In a specific embodiment, the system may monitor the documents and topics being discussed based on previous feedback received from the customer. For example, the system may determine that the customer previously had a negative experience when disputing a transaction, the system may then monitor the customers communication session and in response to determining that the user is again disputing a transaction, present the customer feedback interface to gauge whether or not the customer is having a better experience with the business as it relates to that specific aspect of the communication session. The customer may specify through user preferences whether or not they want the customer feedback interface to be constantly or periodically presented throughout the communication session.

As illustrated in FIG. 3A through FIG. 3D one or more feedback methods may be used to gauge the customers experience while interacting with the business (or more specifically a business agent) through a video conference communication session or by another means. The exact method of feedback that is used may be predetermined by the business associated with the video conference session, the customer, or a third-party developer of the interface. Additionally, the types of feedback methods that are utilized within the customer feedback interface may be initially determined by the business entity (e.g. financial institution) and the customer maybe able to further customize the types of feedback methods that are utilized within the customer feedback interface. For example, the customer may be presented from within the online banking platform an option to select which method of feedback will be utilized in the customer feedback interface once a communication session has been initiated. In this way, the user may be more apt to participate and provide feedback if a preferred method of feedback is used to gauge the customer's experience. The option may be presented simultaneously as the request to communicate with the agent is being transmitted and prior to the video conference session being initiated between the customer and the agent. In other embodiments, the option may be presented prior the request to communicate with the agent is ever received. In an embodiment where the exact method of feedback utilized within the customer feedback interface has been predetermined by the business associated with the video conference session, the business may be able to further specify methods of feedback that are allowable within the customer feedback interface. In this way, the customer may be restricted from customizing the customer feedback interface to utilize methods of feedback that have not been authorized by the business entity.

In one embodiment, the customer feedback interface 200 may comprise labels 300 that indicate the specific aspect of the experience that the user is providing feedback for, and the customer may indicate whether or not they liked or disliked the specific aspect. In another embodiment, the customer feedback interface may comprise a user input field that allows the customer to input the specific aspect of the experience that they desire to provide feedback for, and the customer may subsequently indicate whether or not they liked or disliked the specific aspect.

As illustrated in FIG. 3A, the customer feedback interface may utilize a like and/or dislike system as a method of feedback for gauging the customers experience or contentment throughout the communication session. After initiating a communication session between the customer and the business, the system may present on the display a customer feedback interface that utilizes a like/dislike system as a method of feedback, where the customer may indicate their level of contentment with the overall experience or specific aspects of the communication by indicating that they "Like" or "Dislike" the specific aspects. In this way, the customer feedback interface may comprise selectable icons that are dedicated to indicating whether the not the user is having a positive or negative experience upon selection of the icons. The icons may include, but not be limited to, thumbs up/thumbs down icons, smiley face/frowning face icons, Green/Red icons, "+"/"−" icons, "Like"/"Dislike" icons, "Yes"/"No" icons and the like.

As illustrated in FIG. 3B, the customer feedback interface may utilize a grading system as a method of feedback for gauging the customers experience or contentment throughout the communication session. After initiating a communication session between the customer and the business, the system may present on the display a customer feedback interface that utilizes a grading system as a method of feedback, where the customer may indicate their level of contentment with the overall experience or specific aspects of the communication by indicating how they would grade the specific aspects. In this way, the customer feedback interface may comprise selectable polling buttons or user input fields that are dedicated to indicating whether the not the user is having a positive or negative experience upon selection of the icons. The polling buttons may include, but not be limited to, an A to F grading scale, a 100% to 0% grading scale, a 1 to 10 numeric scale (where the end of the scale that corresponds to a positive/negative experience may be defined by the business and specified to the customer prior to receiving feedback), and the like. Likewise, the customer feedback interface may comprise user input fields for the customer to specify a grade for specific aspects of their experience.

As illustrated in FIG. 3C, the customer feedback interface may utilize a sliding scale system as a method of feedback for gauging the customers experience or contentment throughout the communication session. After initiating a communication session between the customer and the business, the system may present on the display a customer feedback interface that utilizes a sliding scale system as a method of feedback, where the customer may indicate their level of contentment with the overall experience or specific aspects of the communication by sliding an indicator towards certain extremes of the scale in which one end of the scale may indicate that the customer is having a more positive experience, and the other end of the scale may indicate that the customer is having a more negative experience, and the middle of the scale may indicate that the customer's experience is neutral. In this way, the outer extremes of the scale may include positive/negative identifiers or labels such as an alphabetic sliding scale ranging from A to F, a color coded sliding scale ranging from Green-Yellow-Red, a percentile sliding scale ranging from 0% to 100%, a numeric sliding scale ranging from 1 to 10 (where the end of the scale that corresponds to a positive/negative experience may be defined by the business and specified to the customer prior to receiving feedback), and the like.

As illustrated in FIG. 3D, the customer feedback interface may utilize open-ended response as a method of feedback for gauging the customers experience or contentment throughout the communication session. After initiating a communication session between the customer and the business, the system may present on the display a customer feedback interface that utilizes a comment box as a method of feedback, where the customer may indicate their level of contentment with the overall experience or specific aspects of the communication by providing comments on how the business may improve or what aspects of the communication that they liked or disliked through an open-ended response.

As illustrated in FIG. 3E, the customer feedback interface may utilize polling graph as a method of feedback for gauging the customers experience or contentment throughout the communication session. In some embodiments, the polling graph may combine various methods of feedback previously discussed herein. As illustrated the vertical axis of the polling graph may be related a grading system (or other method of feedback) for rating the business agent, the horizontal axis of the polling graph may be related to the time elapsed during the communication session, and various points throughout the line graph may indicate the topics of discussion throughout the communication session. The various topics of discussion may be time stamped throughout the graph. In other embodiment the vertical axis of the polling graph may be related to a grading system for the customer to rate their level of understanding for a particular topic that is being discussed. After initiating a communication session between the customer and the business, the system may present on the display a customer feedback interface that utilizes the polling graph as a method of feedback, where the customer may indicate their level of contentment with the overall experience or specific aspects of the communication by frequently assessing the business agent, their understanding topics of discussion. In one embodiment, the graph may have a toggle feature such that the vertical axis may toggle between subjects and allow the customer to grade different aspects of communication session (e.g. business agent, level of understanding, and the like). In such an embodiment, the graph may comprise multiple lines that indicate the various feedback points provided by the customer throughout the call. For example, ratings related to the business agent or the customer's level of understanding may be simultaneously presented on the graph. In some embodiments, the business agent is able to view the polling graph in real-time such that he or she may address low polling ratings. For example, if the business agent views sudden plunge in the customer's level of understanding during the discussion of a specific topic, the business agent is able to immediately visualize a need to go back and re-explain the topic to the customer. Similarly, the polling graph may be communicated to the business agent after the communication session has ended. As such, the polling graph may indicate points of discussion that may require additional education or training if the business agent received low ratings and did not explain a particular topic well. In some embodiments, the system may automatically determine a need for education or training services to be provided based on the polling graph, and in particular an analysis of low ratings on the polling graph with respect to the discussion topic. For example, if the discussion topic associated with a low rating was a transaction dispute the system may determine that training is not needed and the customer was upset. However, if the discussion topic associated with a low rating was an explanation of a loan product the system may determine that training is needed and the business agent needs more education on explaining the topic to customer's. The customer may also rate the pace of the communication session. For example, the customer may provide feedback as to whether or not the business agent is taking too long to explain a particular topic, and the business agent may view the feedback in real time and know to speed up the call.

The customer feedback interface is configured to be dynamically positioned about the display of the customer-implemented apparatus in various non-fixed orientations as opposed to being presented in a static or fixed position. The customer feedback interface may follow the user from page to page and screen to screen as the customer and business agent navigate through documents and account activity throughout the communication session. After initial presentation of the interface on the customer-implemented apparatus display the customer feedback interface may be rearranged by the customer in various non-fixed orientations. The customer may be able to select the customer feedback interface and drag-and-drop the interface into any desired position on the display. The initial position at which the interface is presented on the display may be defined by the business associated with the video conference session, the customer, or a third-party developer of the interface. For example, if the business is a financial institution that has a default template used to conduct their video conference sessions with customers, the financial institution may specify that the initial position of the interface should be specific location on the display that corresponds to an empty location on the template in which information is not otherwise displayed. In another example, the customer may have a personal visual preference for how they prefer to view documents, icons, widgets and the like on their computer screens or apparatus displays, the customer may then specify that the initial position of the interface should be specific location on the display according to their personal preference. The customer feedback interface may then be automatically and/or manually repositioned throughout the video conference session either based on changes in the template or changes in the preference of the customer.

In some embodiments, in addition to automatically positioning or repositioning the customer feedback interface on the display of the video conference apparatus, the system may be further configured to determine a level or percentage of transparency for the customer feedback interface based on the position of the customer feedback interface. For example, if important information is being presented on the display and the customer feedback interface is overlapping or positioned on top of the information, the system may be configured to determine that the customer feedback interface is obstructing the view of important information that the customer needs to read, and automatically determine to increase the transparency of the customer feedback interface thus allowing the customer to view the information without the need of repositioning the customer feedback interface. Alternatively, if the important information is removed throughout the session or the customer feedback interface is no longer positioned on top of any information within the display, the system may be configured to determine that a currently transparent customer feedback interface is no longer obstructing the view of important information that the customer needs to see, and automatically determine to decrease the transparency of the customer feedback interface thus allowing the customer to more easily view the options, features, or information presented within the customer feedback interface.

In some embodiments, in addition to automatically positioning or repositioning the customer feedback interface on the display of the video conference apparatus, the system may be further configured to determine whether or not to minimize the customer feedback interface based on the position of the customer feedback interface, the status of the communication session (e.g. in queue, connected, on-hold, transferring, etc), or the location of content being displayed on the display. For example, if important information is being presented on the display and the customer feedback interface is overlapping or positioned on top of the information, the system may be configured to determine that the customer feedback interface is obstructing the view of important information that the customer needs to read, and automatically determine to minimize the customer feedback interface while the information is being presented. Alternatively, if the important information is removed throughout the session or the customer feedback interface is no longer positioned on top of any information within the display, the system may be configured to determine that a currently minimized call indicator widget is no longer obstructing the view of important information that the customer needs to see, and automatically determine to maximize the customer feedback interface on the display thus allowing the customer to more easily view the options, features, or information presented within the call indicator widget.

The customer feedback interface may further comprise an on/off mode. When turned "on", the system may be configured to determine to present the customer feedback interface on the display. Likewise, when turned "off" the system may be configured to determine to not present the customer feedback interface on the display. The customer feedback interface may be placed in either on or off mode at any time before, during, or after the video conference session based on input or user preferences from the customer or the business agent, the type of communication session initiated between the customer and the business agent, one or more business rules or the like.

At blocks 140, after presenting on the display a customer feedback interface, the system may receive, in real-time, feedback provided by the customer via the customer feedback interface. In this way, the business does not have to wait until the communication session has ended in order to receive valuable feedback as it pertains to the customer's current interactions with the business. In some embodiments, after receiving the feedback provided by the customer via the customer feedback interface the system may analyze and process one or more additional actions to enhance the customer's current and future experiences with the business. As such the system is able to react to the feedback in real-time in an attempt to alter a customer's negative experience before the communication sessions ends, or to ensure that the customer continues to have a positive experience throughout the communication session with the business. Additionally, the system may be able to notate any feedback received from the customer and/or save the received feedback as user preferences for the customer to be used in future interactions. In this way, user preferences may be automatically determined by the system based on previously received customer feedback as opposed to being explicitly specified by the customer. The system may be configured to allow the user to customize or alter/change any preferences that were inaccurately determined by the system based on the customer feedback.

The system may analyze, in real-time, the feedback received from the customer and automatically escalate the customers call or video conference session in response to determining that the customer has provided a lot of negative feedback, where the amount of feedback that the customer has provided may exceed a predetermined threshold (as determined by the business entity) for escalating calls. For example, the business may previously determine that if a customer provides negative feedback for three (3) or more aspects of their communication session while interacting with a single business agent, then the customers call or video conference session should be automatically escalated either to another agent, where the second agent may be a manager, team lead, or the like. In some embodiments, the customers negative feedback may be related to the fact that the customers feels a different department within the business can better handle their concerns, as such after the system has determined that the threshold has been exceeded and the customers call should be escalated, the customer may specify (via user input fields, polling button, or the like) a department that they want to be transferred to, and the system may automatically escalate the customers call to a different agent within the specified department.

The system may analyze, in real-time, the feedback received from the customer and automatically assign the business agent a customer service rating based on the feedback of the customer in the individual call or video conference session. In some embodiments, if the business agents' customer service rating drops below a particular threshold throughout the communication session, the system may determine to automatically transfer the customers call or escalate the call to another agent. In other embodiments, the customer service rating may be cumulative and used as a factor to determine whether or not a customer's call or video conference session should be transferred to a particular agent. For example, if a business agent has a low cumulative customer service rating related to all of the communication sessions with customers, this low rating may indicate that historically customers have not had pleasant experiences with the business agent. The system may then determine based on the low rating that a customer who is currently having a negative experience should not be transferred to an agent with a low rating that has historically not be successful in dealing with customers. The customer service rating may be cumulative as it related to the overall experience of the communication session or based on individual aspects of the communication session. For example, if a business agent has a low customer service rating related to transaction disputes, the system may determine based on the low rating that a customer who is disputing a transaction should not be assigned to a business agent that has historically not been successful in handling transactions disputes.

Additionally, the system may create a historical list of customer service ratings that have been previously provided by the customer via the customer feedback interface or determined by the system based on the feedback previously received from the customer. The system may then utilize the saved list of rating and determine which business agent should be initially assigned to a customer's call or video conference or which business agent a customer's call should be transferred or escalated to. For example, if an agent has previously been assigned a low customer service rating as it is related to a specific customer, the system may determine that any time the customer contacts the business, the business agent with the low customer-related rating should not be assigned to handle to customers concerns or request. Likewise, if an agent has previously been assigned a high customer service rating as it is related to a specific customer, the system may determine that anytime the customer is having a negative experience their call should be transferred to a business agent with a high customer-related service rating that has previously had a positive experience in dealing with the customer.

The system may analyze, in real-time, the feedback received from the customer and determine one or more methods or tactics to be used to create a more positive experience for the customer. The determined methods or tactics and/or the received feedback may then be communicated to the assigned business agent to be implemented during the communication session. The determined methods or tactics to be used to create a more positive experience for the customer may include but not be limited to, referring to the customer by their first name, referring to the customer by their last name, providing the customer with an offer or incentive (e.g. coupon, rebate, discount, credit, and the like), transferring the customers call to a different department, escalating the customers call to a manager, and the like. For example, the customer may indicate that their account was over charged; the system may analyze the customer's feedback and determine that this excess has created a negative impact on the customer's business relationship with the business and determine that removing the charges and offering the customer a discount for the next month of service may positively impact the business relationship. The system may then transmit the determined tactic to the business agent so that the business agent can apologize and offer the customer the discount. In some embodiments, the method or tactics are determined based on the previously defined rules and procedures of the company. This may help the business agent by preventing the agent from having to look up the appropriate course of action in a manual before realizing that he/she is authorized to provide the customer with the discount thus increasing customer satisfaction and call handling times.

In some embodiments, the customer feedback may be related to an online banking experience. The system may analyze, in real-time, the feedback received from the customer and determine one or more aspects of the online banking account that should be changed, and process changes to the online banking account in real-time based on the feedback. For example, the customer may indicate that they prefer for only the transaction effective date to be presented on their online banking account statements, in response to analyzing this feedback the system may automatically, in real-time, remove the transaction posted date from the customers online banking account statement.

Instant Customer Service Feedback System and Environment

Referring to FIG. 4, a combination schematic and block diagram is presented of a system 410 for providing instant customer service feedback, in accordance with an embodiment of the invention. The system 410 includes a first or customer-implemented video conferencing apparatus 420 that is located within a private setting, such that the customer 422 can communicate and exchange private information with a business agent 426 through designated communication devices. In one specific example, the customer-implemented video conference apparatus 420 may be located within the customer's home. The customer-implemented video conferencing apparatus 420 includes a computing platform 430 having a memory 432 and a processor 34 in communication with memory 432. In addition, customer-implemented video conferencing apparatus 20 includes a display 436, a video camera 438, a speaker 440 and a microphone 442, all of which are in communication with the processor 434 and may be embodied in hardware and/or software. The video conferencing apparatus 420 may include more than one device, such as dedicated, stationary video conferencing devices or the video conferencing apparatus 420 may be a single device, such as a mobile device (i.e., computing tablet or the like). The memory 432 of video conferencing apparatus 420 stores customer video conferencing module 44 that is configured to implement the display 436, the video camera 438, the speaker 440 and the microphone 442 to conduct a video (and audio) communication session (i.e., a video chat session) with a business agent 426 that is located physically remote from the business location at which the first/customer-implemented video conferencing apparatus 420 is located.

The customer-implemented video-conferencing apparatus 420 is in network 412 communication (wired, wireless or a combination thereof) with a second or agent-implemented video conferencing apparatus 424. Agent-implemented video conferencing apparatus 424 may be any communication device that facilitates audio and video communication, such as personal computer (PC), laptop computer, mobile computing device (e.g., tablet device, mobile/cellular telephone) or the like. The agent-implemented video conferencing apparatus 424 includes a computing platform 446 having a memory 448 and a processor 450 in communication with memory 448. In addition, second video conferencing apparatus 424 includes a display 452, a video camera 454, a speaker 456 and a microphone 458, all of which are in communication with the processor 450 and may be embodied in hardware and/or software. The memory 448 of second/agent-implemented video conferencing apparatus 424 stores agent video conferencing module 460 that is configured to implement the display 452, the video camera 454, the speaker 456 and the microphone 458 to conduct a video (and audio) communication session (i.e., a video chat session) with a customer 422 that is located at the customer-implemented video conferencing apparatus 420.

FIG. 5 is an exemplary block diagram illustrating technical components of a system 500 for providing instant customer service feedback as described in the process flow described in FIG. 1. As illustrated, the system environment 500 includes a network 510, a system 530, and a user input system 540. Also shown in FIG. 5 is a user 545 of the user input system 540. The user input system 540 may be any computing device. The user 545 may be a person who uses the user input system 540 to execute a user application 547. The user application 547 may be an application to communicate with the system 530, perform a transaction, input information onto a user interface presented on the user input system 540, or the like. The user application 547 and/or the system application 537 may incorporate one or more parts of any process flow described herein.

As shown in FIG. 5, the system 530, and the user input system 540 are each operatively and selectively connected to the network 510, which may include one or more separate networks. In addition, the network 510 may include a telecommunication network, local area network (LAN), a wide area network (WAN), and/or a global area network (GAN), such as the Internet. It will also be understood that the network 510 is secure and may also include wireless and/or wireline and/or optical interconnection technology.

The user input system 540 may include any computerized apparatus that can be configured to perform any one or more of the functions of the user input system 540 described and/or contemplated herein. For example, the user 545 may use the user input system 540 to transmit and/or receive information or commands to and from the system 530. In some embodiments, for example, the user input system 540 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 5, in accordance with some embodiments of the present invention, the user input system 540 includes a communication interface 542, a processor 544, a memory 546 having a user application 547 stored therein, and a user interface 549. In such embodiments, the communication interface 542 is operatively and selectively connected to the processor 544, which is operatively and selectively connected to the user interface 549 and the memory 546. In some embodiments, the user 545 may use the user application 547 to execute processes described with respect to the process flow and interfaces described herein. Specifically, the user application 547 executes the process flow described in FIG. 1.

Each communication interface described herein, including the communication interface 542, generally includes hardware, and, in some instances, software, that enables the user input system 540, to transport, send, receive, and/or otherwise communicate information to and/or from the communication interface of one or more other systems on the network 510. For example, the communication interface 542 of the user input system 540 may include a wireless transceiver, modem, server, electrical connection, and/or other electronic device that operatively connects the user input system 540 to another system such as the system 530. The wireless transceiver may include a radio circuit to enable wireless transmission and reception of information. Each processor described herein, including the processor 544, generally includes circuitry for implementing the audio, visual, and/or logic functions of the user input system 540. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 547 of the memory 546 of the user input system 540.

Each memory device described herein, including the memory 546 for storing the user application 547 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 5, the memory 546 includes the user application 547. In some embodiments, the user application 547 includes an interface for communicating with, navigating, controlling, configuring, and/or using the user input system 540. In some embodiments, the user application 547 includes computer-executable program code portions for instructing the processor 544 to perform one or more of the functions of the user application 547 described and/or contemplated herein. In some embodiments, the user application 547 may include and/or use one or more network and/or system communication protocols.

Also shown in FIG. 5 is the user interface 549. In some embodiments, the user interface 549 includes one or more output devices, such as a display and/or speaker, for presenting information to the user 545. In some embodiments, the user interface 549 includes one or more input devices, such as one or more buttons, keys, dials, levers, directional pads, joysticks, accelerometers, controllers, touchpads, touchscreens, haptic interfaces, microphones, scanners, motion detectors, cameras, and/or the like for receiving information from the user 545. In some embodiments, the user interface 549 includes the input and display devices of a mobile device, which are operable to receive and display information.

FIG. 5 also illustrates a system 530, in accordance with an embodiment of the present invention. The system 530 may refer to the "apparatus" described herein. The system 530 may include any computerized apparatus that can be configured to perform any one or more of the functions of the system 530 described and/or contemplated herein. In accordance with some embodiments, for example, the system 530 may include a computer network, an engine, a platform, a server, a database system, a front end system, a back end system, a personal computer system, and/or the like. Therefore, the system 530 may be a server managed by the entity. The system 530 may be located at the facility associated with the entity or remotely from the facility associated with the entity. In some embodiments, such as the one illustrated in FIG. 10, the system 530 includes a communication interface 532, a processor 534, and a memory 536, which includes a system application 537 and a datastore 538 stored therein. As shown, the communication interface 532 is operatively and selectively connected to the processor 534, which is operatively and selectively connected to the memory 536.

It will be understood that the system application 537 may be configured to implement any one or more portions of the various user interfaces and/or process flow described herein. The system application 537 may interact with the user application 547. It will also be understood that, in some embodiments, the memory includes other applications. It will also be understood that, in some embodiments, the system application 537 is configured to communicate with the datastore 538, the user input system 540, or the like.

It will be further understood that, in some embodiments, the system application 537 includes computer-executable program code portions for instructing the processor 534 to perform any one or more of the functions of the system application 537 described and/or contemplated herein. In some embodiments, the system application 537 may include and/or use one or more network and/or system communication protocols.

In addition to the system application 537, the memory 536 also includes the datastore 538. As used herein, the datastore 538 may be one or more distinct and/or remote datastores. In some embodiments, the datastore 538 is not located within the system and is instead located remotely from the system. In some embodiments, the datastore 538 stores information or data described herein.

It will be understood that the datastore 538 may include any one or more storage devices, including, but not limited to, datastores, databases, and/or any of the other storage devices typically associated with a computer system. It will also be understood that the datastore 538 may store information in any known way, such as, for example, by using one or more computer codes and/or languages, alphanumeric character strings, data sets, figures, tables, charts, links, documents, and/or the like. Further, in some embodiments, the datastore 538 may include information associated with one or more applications, such as, for example, the system application 537. It will also be understood that, in some embodiments, the datastore 538 provides a substantially real-time representation of the information stored therein, so that, for example, when the processor 534 accesses the datastore 538, the information stored therein is current or substantially current.

It will be understood that the embodiment of the system environment illustrated in FIG. 5 is exemplary and that other embodiments may vary. As another example, in some embodiments, the system 530 includes more, less, or different components. As another example, in some embodiments, some or all of the portions of the system environment 500 may be combined into a single portion. Likewise, in some embodiments, some or all of the portions of the system 530 may be separated into two or more distinct portions.

In addition, the various portions of the system environment 500 may be maintained for and/or by the same or separate parties. It will also be understood that the system 530 may include and/or implement any embodiment of the present invention described and/or contemplated herein. For example, in some embodiments, the system 530 is configured to implement any one or more of the embodiments of the process flows described and/or contemplated herein in connection any process flow described herein. Additionally, the system 530 or the user input system 540 is configured to initiate presentation of any of the user interfaces described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing instant customer service feedback, the system comprising:

a video conferencing apparatus associated with a customer and including a processor, a memory, a display in communication with the processor, a video camera in communication with the processor, a speaker in communication with the processor, and a microphone in communication with the processor; and a video conferencing module stored in the memory, comprising executable instructions that when executed by the processor cause the processor to:

transmit an indication that the customer requires communication between the video conferencing apparatus associated with the customer and a second video conferencing apparatus associated with an agent, wherein the second video conferencing apparatus is remotely located from the customer and the video conferencing apparatus associated with the customer;

retrieve network information from the transmitted indication, wherein the network information comprises information relevant to establishing a network connection between the video conferencing apparatus associated with the customer and the second video conferencing apparatus, wherein the network information comprises device information associated with the video conferencing apparatus associated with the customer and the second video conferencing apparatus;

initiate a video conference communication session between the customer and the business agent, wherein initiating the video conference session comprises providing a multimedia interface between the second video conferencing apparatus operated by the agent and the video conferencing apparatus associated with the customer that provides the agent and the customer with an audio and video feedback of one another;

receive, via the video conferencing apparatus associated with the customer, an indication from the customer to execute a first transaction;

receive a first transaction information associated with the first transaction, via the video conferencing apparatus associated with the customer, wherein the first transaction information comprises a first transaction type, wherein the first transaction type is associated with a first authentication level;

receive, via the video conferencing apparatus associated with the customer, one or more authentication credentials associated with the first authentication level from the customer;

validate the one or more authentication credentials, thereby authorizing the customer to execute the first transaction;

during the execution of the first transaction, receive an indication from the customer to execute a second transaction;

receive a second transaction information associated with the second transaction via the video conferencing apparatus associated with the customer, wherein the second transaction information comprises a second transaction type;

determine that the second transaction type is not within the first authentication level;

determine that the second transaction type is associated with a second authentication level;

receive, via the video conferencing apparatus associated with the customer, one or more authentication credentials associated with the second authentication level from the customer;

validate the one or more authentication credentials, thereby authorizing the customer to execute the second transaction;

after initiating the video conference communication session, initiate presentation on the display of a customer feedback interface configured to receive feedback in real-time from the customer during the video conference communication session;

determine an initial position of the customer feedback interface on the display based on determining the video conference communication session is utilizing a template for displaying information to the customer, wherein the customer feedback interface is constantly presented on the display throughout the entire video conference communication session;

automatically reposition the customer feedback interface in response to a change in information presented on the display;

monitor, throughout the video conference communication session, whether or not a position of the customer feedback interface is overlaying at least a portion of information being presented on the display;

automatically determine a level of transparency of the customer feedback interface based on monitoring whether or not the position of the customer feedback interface is overlaying at least a portion of information being presented on the display;

automatically adjust the level of transparency of the customer feedback interface based on determining the level of transparency by: (1) in response to determining the customer feedback interface is overlaying at least a portion of information being presented on the display, automatically increasing the level of transparency of the customer feedback interface, and (2) in response to determining the customer feedback interface is not overlaying at least a portion of information being presented on the display, automatically decreasing the level of transparency of the customer feedback interface;

receive feedback provided by the customer in real-time via the customer feedback interface;

analyze in real time the feedback received from the customer; and automatically transfer the video conference communication session to a third video conferencing apparatus operated by a second business agent in response to determining the feedback received from the customer via the customer feedback interface was negative, wherein the negative feedback exceeds a predetermined threshold for escalating video conference communication sessions.

2. The system of claim 1, wherein the executable instructions when executed further cause the processor to:

present the customer an option to provide feedback throughout the video conference communication session; and in response to determining the customer accepted the option to provide feedback, determine to present the customer feedback interface on the display.

3. The system of claim 1, wherein the customer feedback interface is customized based on customer preferences such that a method of feedback utilized by the customer feedback interface is determined based on receiving the customer preferences.

4. The system of claim 1, wherein a method of feedback utilized by the customer feedback interface comprises a like and dislike system for gauging the customer's experience throughout the video conference communication session, such that the customer may indicate whether or not they liked or disliked at least one aspect of the video conference communication session.

5. The system of claim 1, wherein a method of feedback utilized by the customer feedback interface comprises a grading system for gauging the customer's experience throughout the video conference communication session, such that the customer may grade at least one aspect of the video conference communication session.

6. The system of claim 1, wherein the executable instructions when executed further cause the processor to:
assign the business agent a customer service rating based on the feedback received from the customer.

7. The system of claim 1, wherein the executable instructions when executed further cause the processor to:
create a historical list of customer service ratings that have previously been provided by the customer via the customer feedback interface; and
determine whether or not the business agent should assigned to the video conference communication session based on the historical list of customer service ratings.

8. The system of claim 1, wherein the executable instructions when executed further cause the processor to:
determine at least one method to improve the customer's customer service experience based on the feedback received from the customer.

9. A computer program product for instant customer service feedback, the computer program product comprising:
a non-transitory computer readable storage medium having computer readable program code embodied therewith, the computer readable program code comprising:
a set of codes that when executed cause a computer to transmit an indication that a customer requires communication between a video conferencing apparatus associated with the customer and a second video conferencing apparatus associated with an agent, wherein the second video conferencing apparatus is remotely located from the customer and the video conferencing apparatus associated with the customer;
a set of codes that when executed cause a computer to retrieve network information from the transmitted indication, wherein the network information comprises information relevant to establishing a network connection between the video conferencing apparatus associated with the customer and the second video conferencing apparatus, wherein the network information comprises device information associated with the video conferencing apparatus associated with the customer and the second video conferencing apparatus;
a set of codes that when executed cause a computer to initiate a video conference communication session between the customer and the business agent, wherein initiating the video conference session comprises providing a multimedia interface between the second video conferencing apparatus operated by the agent and the video conferencing apparatus associated with the customer that provides the agent and the customer with an audio and video feedback of one another;
a set of codes that when executed cause a computer to receive, via the video conferencing apparatus associated with the customer, an indication from the customer to execute a first transaction;
a set of codes that when executed cause a computer to receive a first transaction information associated with the first transaction, via the video conferencing apparatus associated with the customer, wherein the first transaction information comprises a first transaction type, wherein the first transaction type is associated with a first authentication level;
a set of codes that when executed cause a computer to receive, via the video conferencing apparatus associated with the customer, one or more authentication credentials associated with the first authentication level from the customer;
a set of codes that when executed cause a computer to validate the one or more authentication credentials, thereby authorizing the customer to execute the first transaction;
a set of codes that when executed cause a computer to during the execution of the first transaction, receive an indication from the customer to execute a second transaction;
a set of codes that when executed cause a computer to receive a second transaction information associated with the second transaction via the video conferencing apparatus associated with the customer, wherein the second transaction information comprises a second transaction type;
a set of codes that when executed cause a computer to determine that the second transaction type is not within the first authentication level;
a set of codes that when executed cause a computer to determine that the second transaction type is associated with a second authentication level;
a set of codes that when executed cause a computer to receive, via the video conferencing apparatus associated with the customer, one or more authentication credentials associated with the second authentication level from the customer;
a set of codes that when executed cause a computer to validate the one or more authentication credentials, thereby authorizing the customer to execute the second transaction;
a set of codes that when executed cause a computer to after initiating the video conference communication session, initiate presentation on the display of a customer feedback interface configured to receive feedback in real-time from the customer during the video conference communication session;
a set of codes that when executed cause a computer to determine an initial position of the customer feedback interface on the display based on determining the video conference communication session is utilizing a template for displaying information to the customer, wherein the customer feedback interface is constantly presented on the display throughout the entire video conference communication session;
a set of codes that when executed cause a computer to automatically reposition the customer feedback interface in response to a change in information presented on the display;
a set of codes that when executed cause a computer to monitor, throughout the video conference communication session, whether or not a position of the customer feedback interface is overlaying at least a portion of information being presented on the display;
a set of codes that when executed cause a computer to automatically determine a level of transparency of the customer feedback interface based on monitoring whether or not the position of the customer feedback interface is overlaying at least a portion of information being presented on the display;
a set of codes that when executed cause a computer to automatically adjust the level of transparency of the customer feedback interface based on determining the level of transparency by: (1) in response to determining the customer feedback interface is overlaying at least a portion of information being presented on the display, automatically increasing the level of transparency of the customer feedback interface, and (2) in response to determining the customer feedback interface is not overlaying at least a portion of information being presented on the display, automatically decreasing the level of transparency of the customer feedback interface;
a set of codes that when executed cause a computer to receive feedback provided by the customer in real-time via the customer feedback interface;
a set of codes that when executed cause a computer to analyze in real time the feedback received from the customer; and
a set of codes that when executed cause a computer to automatically transfer the video conference communication session to a third video conferencing apparatus operated by a second business agent in response to determining the feedback received from the customer via the customer feedback interface was negative, wherein the negative feedback exceeds a predetermined threshold for escalating video conference communication sessions.

10. The computer program product of claim 9, wherein the computer program product further comprises a set of codes that when execute cause a computer to:
determine at least one method to improve the customer's customer service experience based on the feedback received from the customer.

11. A computer-implemented method for instant customer service feedback, the method comprising:
transmitting, by a video conferencing module executed by a processor, an indication that a customer requires communication between a video conferencing apparatus associated with the customer and a second video conferencing apparatus associated with an agent, wherein the second video conferencing apparatus is remotely located from the customer and the video conferencing apparatus associated with the customer;
retrieving, by a video conferencing module executed by a processor, network information from the transmitted indication, wherein the network information comprises information relevant to establishing a network connection between the video conferencing apparatus associated with the customer and the second video conferencing apparatus, wherein the network information comprises device information associated with the video conferencing apparatus associated with the customer and the second video conferencing apparatus;
initiating, by a video conferencing module executed by a processor, a video conference communication session between the customer and the business agent, wherein initiating the video conference session comprises providing a multimedia interface between the second video conferencing apparatus operated by the agent and the video conferencing apparatus associated with the customer that provides the agent and the customer with an audio and video feedback of one another;
receiving, via the video conferencing apparatus associated with the customer, an indication from the customer to execute a first transaction;
receiving, by a video conferencing module executed by a processor, a first transaction information associated with the first transaction, via the video conferencing apparatus associated with the customer, wherein the first transaction information comprises a first transaction type, wherein the first transaction type is associated with a first authentication level;
receiving, via the video conferencing apparatus associated with the customer, one or more authentication credentials associated with the first authentication level from the customer;
validating, by a video conferencing module executed by a processor, the one or more authentication credentials, thereby authorizing the customer to execute the first transaction;
during the execution of the first transaction, receiving, by a video conferencing module executed by a processor, an indication from the customer to execute a second transaction;
receiving, by a video conferencing module executed by a processor, a second transaction information associated with the second transaction via the video conferencing apparatus associated with the customer, wherein the second transaction information comprises a second transaction type;
determining, by a video conferencing module executed by a processor, that the second transaction type is not within the first authentication level;
determining, by a video conferencing module executed by a processor, that the second transaction type is associated with a second authentication level;
receiving, via the video conferencing apparatus associated with the customer, one or more authentication credentials associated with the second authentication level from the customer;
validating the one or more authentication credentials, thereby authorizing the customer to execute the second transaction;
after initiating the video conference communication session, initiating, by a video conferencing module executed by a processor, presentation on the display of a customer feedback interface configured to receive feedback in real-time from the customer during the video conference communication session;
determining, by a video conferencing module executed by a processor, an initial position of the customer feedback interface on the display based on determining the video conference communication session is utilizing a template for displaying information to the customer, wherein the customer feedback interface is constantly presented on the display throughout the entire video conference communication session;
automatically repositioning, by a video conferencing module executed by a processor, the customer feedback interface in response to a change in information presented on the display;
monitoring, throughout the video conference communication session, whether or not a position of the customer feedback interface is overlaying at least a portion of information being presented on the display;
automatically determining a level of transparency of the customer feedback interface based on monitoring whether or not the position of the customer feedback interface is overlaying at least a portion of information being presented on the display;

automatically adjusting the level of transparency of the customer feedback interface based on determining the level of transparency by: (1) in response to determining the customer feedback interface is overlaying at least a portion of information being presented on the display, automatically increasing the level of transparency of the customer feedback interface, and (2) in response to determining the customer feedback interface is not overlaying at least a portion of information being presented on the display, automatically decreasing the level of transparency of the customer feedback interface;

receiving, by a video conferencing module executed by a processor, feedback provided by the customer in real-time via the customer feedback interface;

analyzing in real time the feedback received from the customer; and automatically transferring the video conference communication session to a third video conferencing apparatus operated by a second business agent in response to determining the feedback received from the customer via the customer feedback interface was negative, wherein the negative feedback exceeds a predetermined threshold for escalating video conference communication sessions.

12. The computer-implemented method of claim 11, wherein the method further comprises:

determining at least one method to improve the customer's customer service experience based on the feedback received from the customer.

13. The computer-implemented method of claim 11, wherein the method further comprises:

presenting the customer an option to provide feedback throughout the video conference communication session; and in response to determining the customer accepted the option to provide feedback, determining to present the customer feedback interface on the display.

14. The computer-implemented method of claim 11, wherein the customer feedback interface is customized based on customer preferences such that a method of feedback utilized by the customer feedback interface is determined based on receiving the customer preferences.

15. The computer-implemented method of claim 11, wherein a method of feedback utilized by the customer feedback interface comprises a like and dislike system for gauging the customer's experience throughout the video conference communication session, such that the customer may indicate whether or not they liked or disliked at least one aspect of the video conference communication session.

16. The computer-implemented method of claim 11, wherein a method of feedback utilized by the customer feedback interface comprises a grading system for gauging the customer's experience throughout the video conference communication session, such that the customer may grade at least one aspect of the video conference communication session.

17. The computer-implemented method of claim 11, comprising assigning the business agent a customer service rating based on the feedback received from the customer.

18. The computer-implemented method of claim 11, comprising:

creating a historical list of customer service ratings that have previously been provided by the customer via the customer feedback interface; and determining whether or not the business agent should assigned to the video conference communication session based on the historical list of customer service ratings.

* * * * *